UNITED STATES PATENT OFFICE.

THOMAS KERFOOT, OF MANCHESTER, ENGLAND.

METHOD OF PREPARING GRANULAR EFFERVESCENT COMPOUNDS.

SPECIFICATION forming part of Letters Patent No. 543,601, dated July 30, 1895.

Application filed February 10, 1893. Serial No. 461,811. (No specimens.) Patented in England July 15, 1892, No. 12,998.

*To all whom it may concern:*

Be it known that I, THOMAS KERFOOT, a citizen of the United Kingdom of Great Britain and Ireland, residing at Manchester, in the county of Lancaster, England, have invented certain new and useful Improvements in Methods of Preparing Granular Effervescible Materials, of which the following is a specification.

This invention has been patented in Great Britain July 15, 1892, No. 12,998.

The invention relates to the manufacture of granular effervescible mixtures, of which a familiar example is that commonly called "citrate of magnesia." It is well known that these mixtures are compounds of an acid, such as tartaric or citric acid, and a bicarbonate, such as the bicarbonate of soda, and that their effervescence upon being mixed with water arises from the liberation of carbon dioxid consequent upon the combination of the acid with the alkaline base. Other substances of a medicinal character or as flavoring or coloring agents are sometimes mixed with the acid and carbonate, and in some cases the acid may be substituted by a suitable biphosphate or bisulfate. In the usual course of manufacture the moisture contained in the acid produces a reaction and causes the liberation of some of the carbon dioxid, thus reducing the amount of effervescence when the mixture is finally used. The principal object of my invention is to avoid this loss, and for this purpose I separately granulate and dry the acid and the alkaline constituents of the mixture, which are thereafter intimately mixed and packed in air-tight vessels, such as are used for ordinary effervescible mixtures. By following this method of manufacture no appreciable liberation of carbon dioxid will take place until the mixture is finally used.

I will hereinafter describe fully and particularly in what manner my invention may be practically carried into effect; but I desire it to be understood that I do not limit myself to any particular proportions of ingredients, to any system of granulation, or mode of drying.

My method of manufacture is equally applicable to all effervescible mixtures and compounds which are capable of granulation, and it may best be illustrated, by way of example, by describing the processes which I adopt in the production of granular effervescent citrate of magnesia, (so-called.) The acid constituent may consist of ten parts of tartaric or of citric acid or of a mixture of them and five parts of sugar, all powdered and intimately mixed together with just sufficient water to make the mixture slightly damp and sticky, so that it will tend to cohere when pressed together. This mixture is quickly transferred to and rubbed through a sieve having about eight meshes to the inch. The granules so formed are then removed to a drying-chamber, which may be heated to about 100° Fahrenheit, and are called the "acid" granules. The alkaline constituent may consist of ten parts of bicarbonate of soda, five parts of powdered sugar, and two parts of dried sulfate of magnesia in powder. This mixture may be mixed, granulated, and dried in precisely the same manner and by the same means as hereinbefore described for the acid granules, and the granulated product is called the "alkaline" granules. The acid and the alkaline granules are mixed in such proportions as may be desired and are then bottled for sale and use in the ordinary manner. Instead of the sugar and water a thin sirup may be employed for damping the powders.

Medicinal, flavoring, and coloring agents, if used, or such of them as may be used, may be added to the acid mixture or to the alkaline mixture before or during granulation, or may be added to the mixed granules as the circumstances in each case may render advisable.

Having now particularly described and ascertained the nature of my said invention and in what manner the same is to be performed, I declare that what I claim is—

1. In the method of preparing granular effervescible mixtures, the steps consisting of separately submitting the acid and the alkaline constituents to contact with a saccharine adhesive, and then granulating and drying each constituent before assembling the dried material, substantially as described.

2. The hereinbefore described method of preparing granular effervescible mixtures, which consists of separately preparing the reacting agents by mixing with the acid constituent and with the alkaline constituent, sufficient sugar and water to render each mixture coherent, separately granulating each mixture, drying the granules, mixing the dried acid and alkaline granules, and packing the mixture in air tight vessels, substantially as described.

In testimony that I claim the foregoing as my invention I have signed my name, in presence of two witnesses, this 26th day of January, 1893.

THOMAS KERFOOT.

Witnesses:
GEORGE WILLIAM ROWE,
ARTHUR WILLIAM PULMAN.